US011443506B2

(12) United States Patent
Ando et al.

(10) Patent No.: US 11,443,506 B2
(45) Date of Patent: Sep. 13, 2022

(54) BIOMETRIC INFORMATION SENSOR DEVICE

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Takahiko Ando, Aichi (JP); Yosuke Ohashi, Aichi (JP); Rijin Owaki, Aichi (JP); Naoyuki Takada, Aichi-ken (JP); Yuya Goto, Aichi-ken (JP); Yasuhisa Ohta, Aichi-ken (JP); Daisuke Ogawa, Aichi (JP)

(73) Assignees: KABUSHIKI KAISHA TOKAI RIKA DENKI SEISAKUSHO, Aichi (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 26 days.

(21) Appl. No.: 15/734,387

(22) PCT Filed: May 28, 2019

(86) PCT No.: PCT/JP2019/021108
§ 371 (c)(1),
(2) Date: Dec. 2, 2020

(87) PCT Pub. No.: WO2019/235302
PCT Pub. Date: Dec. 12, 2019

(65) Prior Publication Data
US 2021/0166048 A1 Jun. 3, 2021

(30) Foreign Application Priority Data
Jun. 4, 2018 (JP) .............................. JP2018-106874

(51) Int. Cl.
*G06V 10/98* (2022.01)
*G06V 40/10* (2022.01)
(Continued)

(52) U.S. Cl.
CPC ............ *G06V 10/987* (2022.01); *G06V 40/10* (2022.01); *G06V 40/1306* (2022.01); *G06V 40/1365* (2022.01)

(58) Field of Classification Search
CPC .. G06V 10/987; G06V 40/10; G06V 40/1306; G06V 40/1365; G06F 21/32; G06F 3/0487
See application file for complete search history.

(56) References Cited

U.S. PATENT DOCUMENTS

2001/0040988 A1* 11/2001 Takahashi .......... G06V 40/1365
283/69
2012/0250949 A1* 10/2012 Abiko ....................... G06T 1/00
324/661
(Continued)

FOREIGN PATENT DOCUMENTS

JP 2008-171238 A 7/2008
JP 2008-174095 A 7/2008
(Continued)

OTHER PUBLICATIONS

Japanese Office Action, dated Aug. 18, 2020, in Japanese Counterpart Patent Application. No. 2018-106874 (including Partial English Language Translation).
(Continued)

*Primary Examiner* — Edward F Urban
*Assistant Examiner* — Wassim Mahrouka
(74) *Attorney, Agent, or Firm* — Greenblum & Bernstein, P.L.C.

(57) ABSTRACT

A biometric information sensor device includes a control unit that issues a notification for failure to read biometric
(Continued)

information of a detection target when reading of the biometric information fails after a contact of the detection target with a reading surface is detected.

10 Claims, 6 Drawing Sheets

(51) Int. Cl.
  *G06V 40/13* (2022.01)
  *G06V 40/12* (2022.01)

(56) References Cited

U.S. PATENT DOCUMENTS

| | | | |
|---|---|---|---|
| 2018/0144176 A1* | 5/2018 | Ji | G06V 40/1335 |
| 2018/0268188 A1* | 9/2018 | Zhang | G06K 9/00 |

FOREIGN PATENT DOCUMENTS

| | | | | |
|---|---|---|---|---|
| JP | 2008171238 A | * | 7/2008 | G06K 9/0002 |
| JP | 2010-092498 A | | 4/2010 | |
| JP | 2014-123232 A | | 7/2014 | |
| JP | 2016-143069 A | | 8/2016 | |
| JP | 2017-007525 A | | 1/2017 | |

OTHER PUBLICATIONS

International Search Report, dated Sep. 3, 2019 by the Japan Patent Office, in International Application No. PCT/JP2019/021108.
Written Opinion of the International Searching Authority, dated Sep. 3, 2019 by the Japan Patent Office, in International Application No. PCT/JP2019/021108.
Japanese Final Office Action, dated Nov. 17, 2020 in Japanese Counterpart Patent Application. No. 2018-106874 (including English Language Machine Translation).

* cited by examiner

BIOMETRIC INFORMATION SENSOR DEVICE

CROSS-REFERENCES TO RELATED APPLICATIONS

The present patent application claims the priority of Japanese patent application No. 2018/106874 filed on Jun. 4, 2018, and the entire contents of Japanese patent application No. 2018/106874 are hereby incorporated by reference.

TECHNICAL FIELD

The present invention relates to a biometric information sensor device.

BACKGROUND ART

An electronic device is known which is provided with a display and a controller which unlocks upon detection of an unlocking operation and shows a first screen on the display (see, e.g., Patent Literature 1).

The electronic device is further provided with a fingerprint sensor. When a fingerprint information read by the fingerprint sensor and a fingerprint information of a pre-registered thumb match within a predetermined range, the controller determines that the unlocking operation is an operation performed by the thumb. Then, when the unlocking operation is an operation performed by the thumb, the controller shows a second screen, which is different from the first screen, on the display.

CITATION LIST

Patent Literature

Patent Literature 1: JP 2016/143069 A

SUMMARY OF INVENTION

Technical Problem

When, e.g., the thumb moves during reading of the fingerprint or the contact time is short, the fingerprint sensor provided on the electronic device disclosed in Patent Literature 1 cannot read the fingerprint and authentication or registration does not proceed. Since there is no notification that the fingerprint cannot be read, there is a problem that the user repeats attempt of fingerprint reading without recognizing the read failure and operability is thus poor.

It is an object of the invention to provide a biometric information sensor device which can provide improved operability.

Solution to Problem

A biometric information sensor device in an embodiment of the invention comprises a control unit that issues a notification for failure to read biometric information of a detection target when reading of the biometric information fails after a contact of the detection target with a reading surface is detected.

Advantageous Effects of Invention

According to an embodiment of the invention, it is possible to provide a biometric information sensor device which provides improved operability.

DESCRIPTION OF EMBODIMENTS

Short Summary of the Embodiment

A biometric information sensor device in an embodiment of the invention is generally configured to include a control unit that issues a notification for failure to read biometric information of a detection target when reading of the biometric information fails after a contact of the detection target with a reading surface is detected.

Since the biometric information sensor device issues a notification for failure to read biometric information after detection of the contact, users are less likely to repeat attempt of reading without recognizing the read failure and operability is thereby improved, as compare to when such a configuration is not adopted.

Embodiment

General Configuration of a Biometric Information Sensor Device 1

Figure 1A:
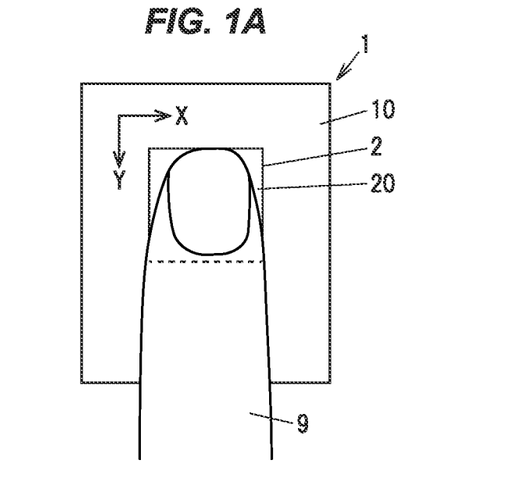
FIG. 1A is an explanatory diagram illustrating a biometric information sensor device in an embodiment.
Figure 1B:
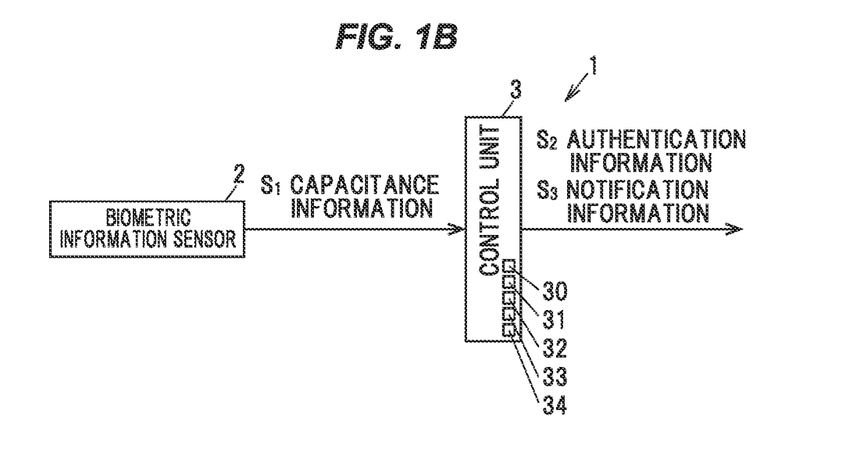
FIG. 1B is a block diagram illustrating the biometric information sensor device in the embodiment.
Figure 1C:
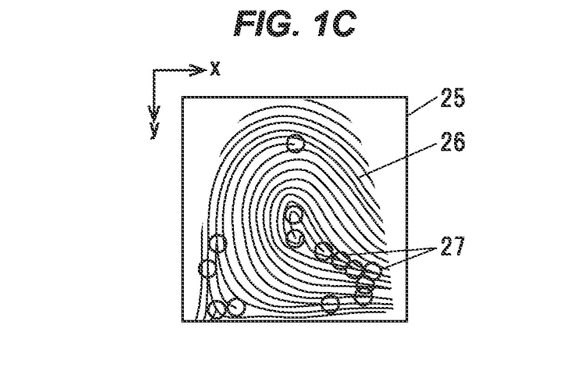
FIG. 1C is an explanatory diagram illustrating a captured image which is captured by a biometric information sensor of the biometric information sensor device in the embodiment.
Figure 2A:
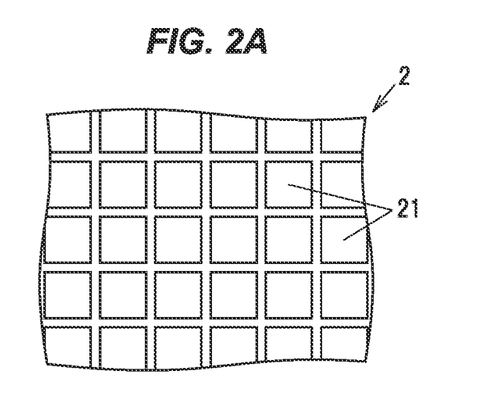
FIG. 2A is an explanatory diagram for explaining the biometric information sensor of the biometric information sensor device in the embodiment.
Figure 2B:
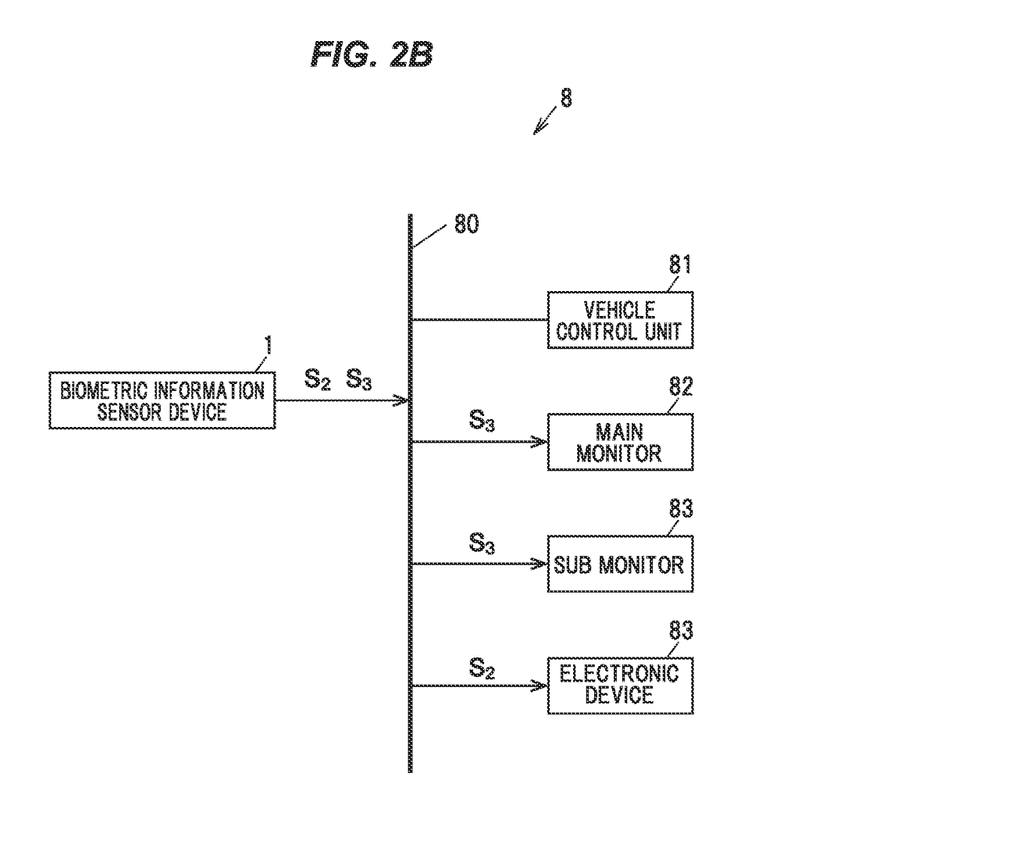
FIG. 2B is a block diagram illustrating an in-vehicle communication system which includes the biometric information sensor device in the embodiment.

FIG. 1A is an explanatory diagram illustrating a biometric information sensor device in an embodiment, FIG. 1B is a block diagram illustrating the biometric information sensor device in the embodiment, and FIG. 1C is an explanatory diagram illustrating a captured image which is captured by a biometric information sensor in the embodiment. FIG. 2A is an explanatory diagram for explaining the biometric information sensor of the biometric information sensor device in the embodiment, and FIG. 2B is a block diagram illustrating an in-vehicle communication system which includes the biometric information sensor device in the embodiment.

In each drawing of the embodiment described below, a scale ratio may be different from an actual ratio. In addition, in FIGS. 1B and 2B, flows of main information are indicated by arrows.

A biometric information sensor device 1 is configured to, e.g., read biometric information of a detection target and performs authentication by comparison to a template of registered biometric information. The detection target in the present embodiment is an operation finger of a user. The biometric information to be read is a fingerprint of the operation finger. However, the biometric information is not limited to the fingerprint of the operation finger and may be a vein of the operation finger or of a palm. In FIG. 1C, a captured fingerprint of the user, i.e., a captured biometric information 26 of the user is shown as an example.

The biometric information sensor device 1 is generally configured to include, e.g., a control unit 3 which issues a notification for failure to read the biometric information 26 of an operation finger 9 when reading of the biometric information 26 fails after a contact of the operation finger 9 with a reading surface 20 is detected, as shown in FIG. 1A to 1C.

The biometric information sensor device 1 is also provided with, e.g., a biometric information sensor 2 which has plural detection electrodes 21 under the reading surface 20 and reads the biometric information 26 by means of capacitance generated between the operation finger 9 contacting the reading surface 20 and the plural detection electrodes 21, as shown in FIG. 1A to 2A. The control unit 3 is configured to determine the contact of the operation finger 9 based on plural capacitances obtained as a result of scanning the reading surface 20 by the biometric information sensor 2, and then determine whether the biometric information 26 is read based on plural capacitances acquired after the contact of the operation finger 9 is determined.

The biometric information sensor device 1 in the present embodiment is mounted on a vehicle, as an example. As an example, the biometric information sensor device 1 is arranged on a start switch for giving an instruction to turn on a drive system of the vehicle. Then, the biometric information sensor device 1 issues a notification using, e.g., an in-vehicle communication system 8 which enables communication between on-vehicle devices mounted on the vehicle, as shown in FIG. 2B.

As an example, the in-vehicle communication system 8 is generally configured to include an in-vehicle LAN (Local Area Network) 80, a vehicle control unit 81, a main monitor 82, a sub monitor 83 and an electronic device 84, as shown in FIG. 2B.

The in-vehicle LAN 80 is, e.g., a vehicular network which enables reciprocal exchange of signals or information with wire or wireless, such as CAN (Controller Area Network) or LIN (Local Interconnect Network). The vehicle control unit 81 controls, e.g., the in-vehicle communication system 8.

The main monitor 82 is arranged on, e.g., a center console, etc., of the vehicle and shows a map or various menus, etc. Meanwhile, the sub monitor 83 is arranged on, e.g., an instrument panel of the vehicle and displays gauges and fuel level, etc. The electronic device 84 is, e.g., a seat driving device, an air conditioner, or a mirror driving device.

When issuing, e.g., a notification for failure to read the biometric information 26, the biometric information sensor device 1 displays a message as the notification on at least one of the main monitor 82 and the sub monitor 83. The notification method is not limited to the message, and may be a method using sound, light or vibration, etc., or may be a combination of the message display and sound, light or vibration, etc.

On the other hand, when, e.g., the biometric information 26 is successfully authenticated, the biometric information sensor device 1 outputs authentication information $S_2$ which indicates successful authentication. The electronic device 84 implements, e.g., a setting which has been set by a user who is successfully authenticated based on the authentication information $S_2$. The electronic device 84 when being, e.g., a seat driving device moves a seat to a seat position which has been set by the user. Meanwhile, the electronic device 84 when being, e.g., an air conditioner implements the settings, such as the set temperature and the air volume, which have been set by the user. Furthermore, the electronic device 84 when being, e.g., a mirror driving device drives mirrors to the positions which have been set by the user.

Configuration of the Biometric Information Sensor 2

The biometric information sensor 2 is a capacitive sensor, as described above. The biometric information sensor 2 reads, e.g., a fingerprint, i.e., the biometric information 26 from the operation finger 9 which is in contact with the reading surface 20 provided on a main body 10, as shown in FIG. 1A.

As a modification, the biometric information sensor 2 may be, e.g., a sensor of optical type, pressure-sensitive type or thermal type, etc., which is configured to read a fingerprint. Alternatively, the biometric information sensor 2 may be, e.g., a sensor configured to read a palm print, etc. Furthermore, the biometric information sensor 2 may be configured to read a vein of the operation finger or of a palm as the biometric information 26. The vein is read using, e.g., a sensor configured to read a vein pattern based on reflection of emitted infrared light. Alternatively, the biometric information sensor 2 may be a sensor as a combination of these sensors.

As another modification, the biometric information sensor device 1 may be configured to have, e.g., a sensor for detecting a contact with the reading surface 20 and a sensor for reading the biometric information 26. The sensor for detecting the contact is, e.g., a sensor which detects a load applied to the reading surface 20, or a sensor which detects the contact with the reading surface 20 by taking an image, etc.

The biometric information sensor 2 is provided with, e.g., the plural detection electrodes 21 which are arranged in a matrix pattern under the reading surface 20, as shown in FIG. 2A. As an example, several ten thousand to several hundred thousand detection electrodes 21 are formed and arranged at intervals of several μm to several tens μm.

An XY coordinate system with, e.g., the origin at the upper left of the paper of FIG. 1A is set on the reading surface 20. When, e.g., rows are in the x-axis direction, the biometric information sensor 2 is configured to scan all detection electrodes 21 by repeating a process of reading capacitances of the detection electrodes 21 arranged in a row and then subsequently reading capacitances of the detection electrodes 21 arranged in a different row. The scanning cycle is about 100 ms, as an example.

The biometric information sensor 2 generates, e.g., capacitance information $S_1$ as information of plural capacitances read by scanning and outputs it to the control unit 3. The capacitance information $S_1$ is, e.g., information of capacitances in one cycle. In particular, the biometric information sensor 2 generates the capacitance information $S_1$ by, e.g., classifying the capacitances into capacitances of not less than a predetermined threshold value to be assigned "1" and capacitances of less than the threshold value to be assigned "0" and associating the capacitances with the positions of the detection electrodes 21.

A captured image 25 shown in FIG. 1C is produced based on the capacitance information $S_1$ in such a manner that the positions of the detection electrodes 21 assigned "1" are shown in black and the positions of the detection electrodes 21 assigned "0" are shown in white, as an example. The circles in the drawing are added to show characteristic features 27 (described later).

The high-capacitance positions are positions of ridges of the fingerprint which are close to the detection electrodes 21, hence, capacitance is high. Meanwhile, the low-capacitance positions are positions of valleys of the fingerprint which are far from the detection electrodes 21, hence, capacitance is low. Therefore, as an example, the captured image 25 shown in FIG. 1C is obtained when the high-capacitance positions are shown in black and the low-capacitance positions are shown in white.

The captured image 25 has a similar shape to the reading surface 20 and is configured that an xy coordinate system corresponding to the XY coordinate system is set thereon. Then, the image shown in black in the captured image 25 is the read biometric information 26.

Configuration of the Control Unit 3

The control unit 3 is, e.g., a microcomputer composed of a CPU (Central Processing Unit) performing calculation and processing, etc., of the acquired data according to a stored program, and a RAM (Random Access Memory) and a ROM (Read Only Memory) which are semiconductor memories, etc. The ROM stores, e.g., a program for operation of the control unit 3, a contact threshold value 30, a similarity threshold value 31, a reading threshold value 32, registration information 33 and a foreign matter determination threshold value 34. The RAM is used as, e.g., a storage area for temporarily storing calculation results, etc.

The contact threshold value 30 is a threshold for determining whether the operation finger 9 contacted the reading surface 20. As an example, when the number of the detection electrodes 21 taking the value of "1" described above is not less than the contact threshold value 30 based on the capacitance information $S_1$, the control unit 3 determines that the operation finger 9 contacted the reading surface 20.

As a modification, when the capacitance information $S_1$ is, e.g., information associating capacitances with the positions of the detection electrodes 21, the contact threshold value 30 may be defined as a capacitance threshold and the control unit 3 may be configured to determine the contact based on the number of the detection electrodes 21 having a capacitance of not less than the contact threshold value 30. However, it is not limited thereto.

The control unit 3 performs an extraction process on the capacitance information $S_1$ and extracts the characteristic features 27. The extraction process is, e.g., a process of extracting fingerprint ridges, etc.

The characteristic feature 27 is, e.g., a center point, a bifurcation point, an ending point or a delta, etc., as shown in FIG. 1C, but it is not limited thereto. The center point is a point at the center of the fingerprint. The bifurcation point is a point at which a fingerprint ridge bifurcates. The ending point is a point at which a ridge ends. The delta is a point at which ridges from three directions meet.

For example, the control unit 3 extracts the characteristic features 27 and generates an extracted image which is an image of the extracted characteristic features 27. The registration information 33 is, e.g., information associating a template containing the registered extracted image with a registered user.

The control unit 3 compares the template in the registration information 33 to an extracted image obtained from the read biometric information 26, and calculates similarity based on the positions of the characteristic features 27 and distances between the characteristic features 27, etc. Then, when the similarity is not less than the similarity threshold value 31, the control unit 3 outputs the authentication information $S_2$ upon determination that the biometric information 26 is successfully authenticated.

The similarity threshold value 31 is 80%, as an example. In other words, when, e.g., the number of the characteristic features 27 used for authentication is eighty and when match is found for not less than sixty-four characteristic features 27, the control unit 3 determines that it is a registered person. The match here includes match of the position of the characteristic feature 27 and a distance between the characteristic features 27, etc.

Notification

Figure 3A:
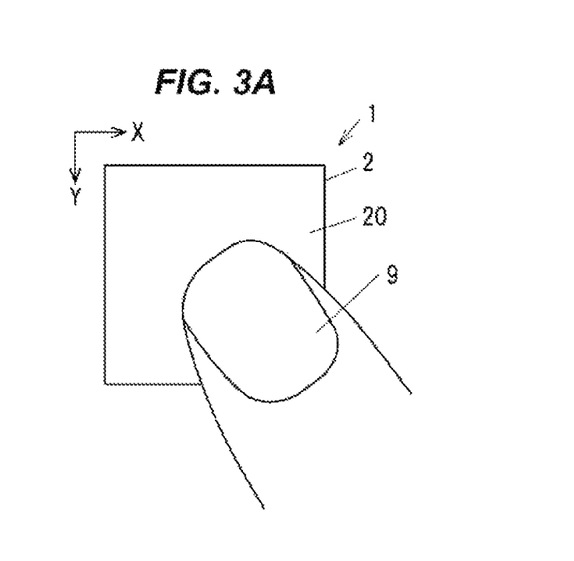
FIG. 3A is an explanatory diagram illustrating a contact with a reading surface of the biometric information sensor device in the embodiment.
Figure 3B:
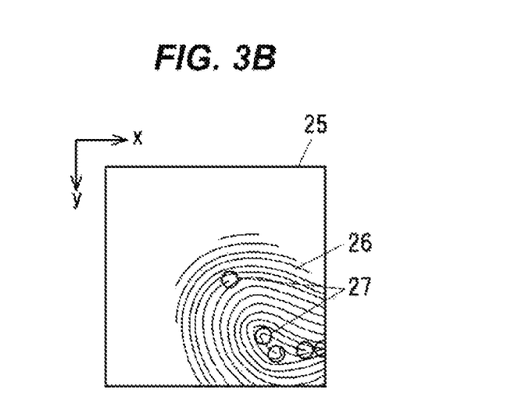
FIG. 3B is an explanatory diagram illustrating a captured image which is captured when the contact with the reading surface of the biometric information sensor device is as shown in FIG. 3A.
Figure 3C:
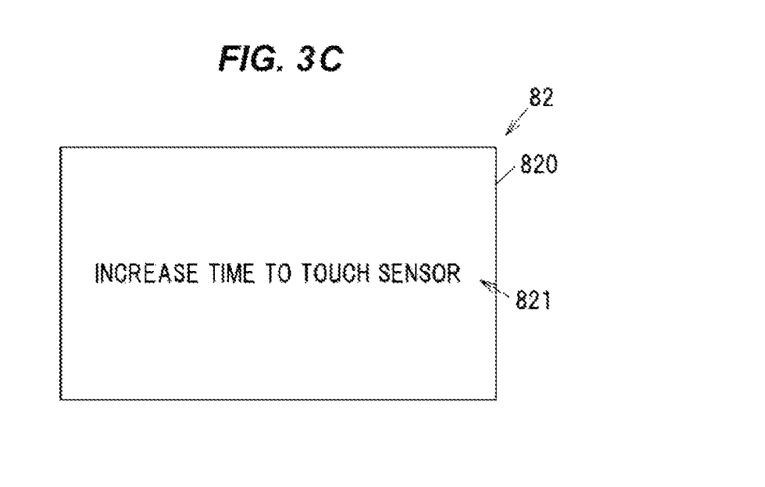
FIG. 3C is an explanatory diagram illustrating a notification issued by the biometric information sensor device in the embodiment.

FIG. 3A is an explanatory diagram illustrating a contact with a reading surface of the biometric information sensor device in the embodiment, FIG. 3B is an explanatory diagram illustrating a captured image which is captured when the contact with the reading surface of the biometric information sensor device is as shown in FIG. 3A, and FIG. 3C is an explanatory diagram illustrating a notification issued by the biometric information sensor device in the embodiment.

The control unit 3 issues a notification in the event of failure to read the biometric information 26. The failure to read is the event where, e.g., reading is only partially completed because the finger has moved or touch time was short.

As an example, when it is presumed that the operation finger 9 has moved relative to the reading surface 20 during the user's operation and the fingerprint was only partially read as shown in FIGS. 3A and 3B, the control unit 3 outputs notification information $S_3$ to notify of it.

In detail, when, e.g., the reading threshold value 32 is defined as the previously-described number of the detection electrodes 21 taking the value of "1" and when the number of the detection electrodes 21 taking the value of "1" is not more than the reading threshold value 32 based on the capacitance information $S_1$, the control unit 3 determines that the reading failed. In this case, the control unit 3 can make a determination without performing the process of extracting the characteristic features 27.

As a modification, when, e.g., the reading threshold value 32 is defined as the number of the characteristic features 27 and when the number of the characteristic features 27 extracted from the captured image 25 is not more than the reading threshold value 32, the control unit 3 determines that the reading failed.

The notification information $S_3$ is, e.g., input to the main monitor 82 or the sub monitor 83 via the in-vehicle LAN 80, as shown in FIG. 2B. When the notification information $S_3$ is input to the main monitor 82, the main monitor 82 displays, as an example, a message 821 such as "Increase time to touch the sensor" or "Do not move your finger" on a screen 820, as shown in FIG. 3C.

The control unit 3 also can determine that a conductive foreign matter is sticking to the reading surface 20. In particular, when, e.g., the number of failures to read the biometric information 26 exceeds a predetermined number (the foreign matter determination threshold value 34) after the contact with the reading surface 20 is detected, the control unit 3 determines that a conductive foreign matter is sticking to the reading surface 20, and issues a notification about the conductive foreign matter.

In this case, the control unit 3 outputs the notification information $S_3$ about the conductive foreign matter. Then, when the notification information $S_3$ is input to the main monitor 82, the main monitor 82 displays, as an example, the message 821 such as "Wipe the reading surface" or "Foreign matter is sticking" on the screen 820.

Figure 4:
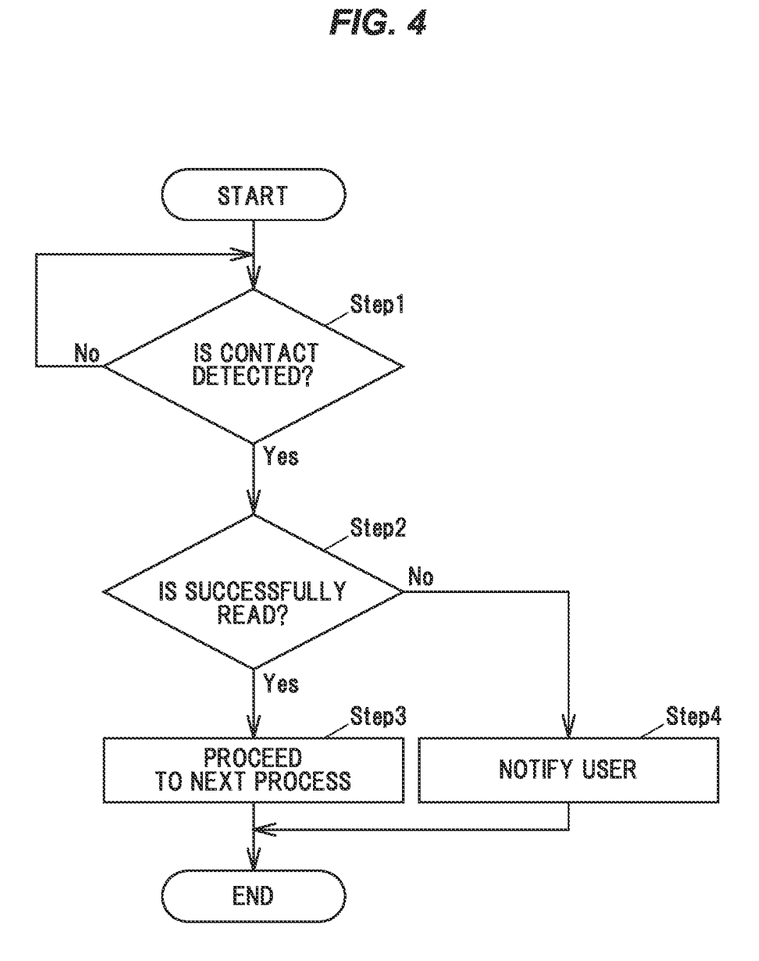
FIG. 4 is a flowchart in the case where the biometric information sensor device in the embodiment issues a notification about user's operation.
Figure 5:
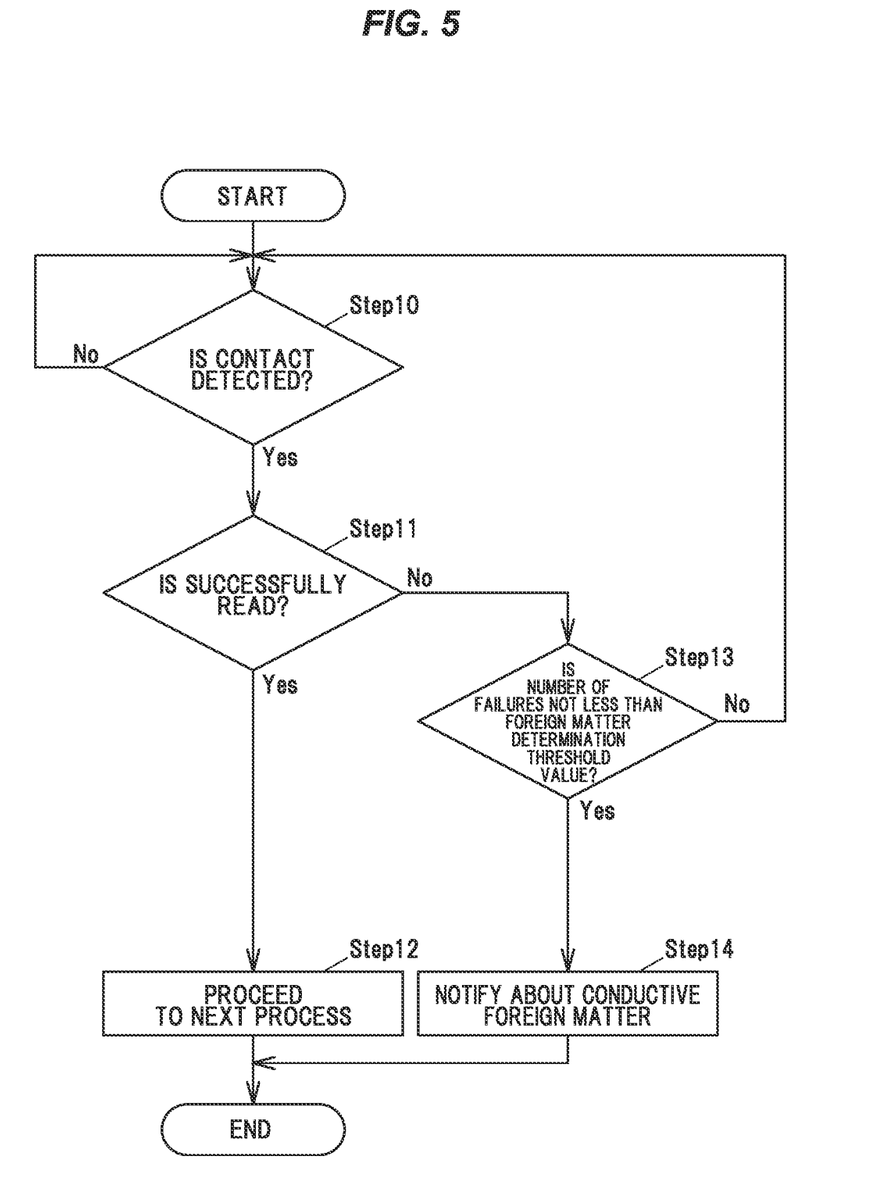
FIG. 5 is a flowchart in the case where the biometric information sensor device in the embodiment issues a notification about conductive foreign matter.
Figure 6:
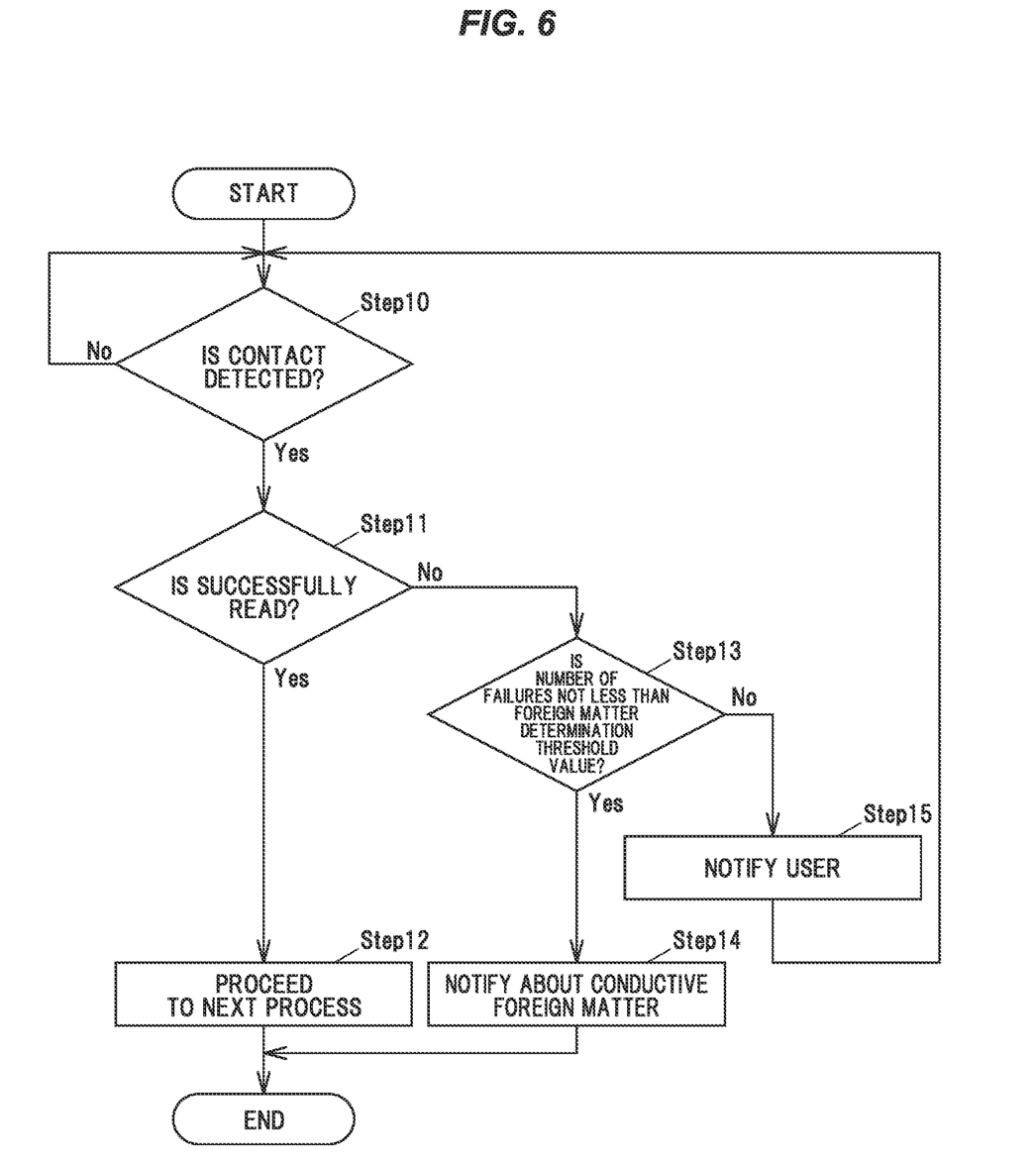
FIG. 6 is a flowchart in the case where the biometric information sensor device in the embodiment issues the notification about user's operation and the notification about conductive foreign matter.

Next, an example of an operation of the biometric information sensor device 1 in the present embodiment will be described along with the flowcharts in FIGS. 4 to 6. FIG. 4 is a flowchart when issuing a notification about user's operation. FIG. 5 is a flowchart when issuing a notification about conductive foreign matter. FIG. 6 is a flowchart when issuing the notification about user's operation and the notification about conductive foreign matter. In the following example, the notifications are displayed on the main monitor 82.

Operation

Notification About User's Operation

The control unit 3 of the biometric information sensor device 1 periodically acquires the capacitance information $S_1$ from the biometric information sensor 2. When it is "Yes" in Step 1, i.e., when the contact is detected (Step 1: Yes), the control unit 3 subsequently determines whether the biometric information 26 is read.

When the biometric information 26 is successfully read (Step 2: Yes), the control unit 3 performs the next process (Step 3). This next process is the process of extracting the characteristic features 27 or the authentication process.

When the reading failed in Step 2 (Step 2: No), the control unit 3 notifies the user of it (Step 4). The control unit 3 generates and outputs the notification information $S_3$. Based on the notification information $S_3$, the main monitor 82 display the message 821 to notify that the touch time is short or the finger has moved.

Notification About Conductive Foreign Matter

The control unit 3 of the biometric information sensor device 1 periodically acquires the capacitance information $S_1$ from the biometric information sensor 2. When it is "Yes" in Step 10, i.e., when the contact is detected (Step 10: Yes), the control unit 3 subsequently determines whether the biometric information 26 is read.

When the biometric information 26 is successfully read (Step 11: Yes), the control unit 3 performs the next process (Step 12). This next process is the process of extracting the characteristic features 27 or the authentication process.

When the reading failed in Step 11 (Step 11: No), the control unit 3 checks the number of consecutive failures. When the read failures occur consecutively and exceed the foreign matter determination threshold value 34 (Step 13: Yes), the control unit 3 issue a notification that a conductive foreign matter is sticking (Step 14). Based on the notification information $S_3$ output from the control unit 3, the main monitor 82 display the message 821 to notify that a conductive foreign matter is sticking. After that, the control unit 3 resets the number of the read failures.

When the number of read failures is smaller than the foreign matter determination threshold value 34 in Step 13 (Step 13: No), the control unit 3 adds 1 to the number of read failures and proceeds the process to Step 10.

In Case of Issuing Notification About User's Operation and Notification About Conductive Foreign Matter Steps 10 to 14 are performed as described above.

When the number of read failures is smaller than the foreign matter determination threshold value 34 in Step 13 (Step 13: No), the control unit 3 adds 1 to the number of read failures and also issues a notification to the user (Step 15), and then proceeds the process to Step 10. The control unit 3 generates and outputs the notification information $S_3$. Based on the notification information $S_3$, the main monitor 82 display the message 821 to notify that the touch time was short or the finger has moved.

When the notification about the user's operation and the notification about the conductive foreign matter are issued, e.g., the notification about the operation is issued after judging "No" in Step 13. That is, the control unit 3 issues the notification about the operation until the number of the read failures exceeds the foreign matter determination threshold value 34, or until being successfully read, or until the contact is removed. In this regard, the scanning cycle of the biometric information sensor device 1 is of the order of milliseconds and it does not take a long time for the number of failures to exceed the foreign matter determination threshold value 34. Therefore, even if the notifications about the operation are continuously issued, it is displayed as if only one notification is issued. In addition, the biometric information sensor device 1 may be configured to issue only one notification instead of continuously issuing the notifications about the operation.

As a modification, the biometric information sensor device 1 may periodically switch between the operation shown in FIG. 4 and the operation shown in FIG. 5. This period is, e.g., not less than the time taken until the number of times the capacitance information $S_1$ indicating read failure is generated reaches the level at which it is determined that the conductive foreign matter is sticking.

Effects of the Embodiment

The biometric information sensor device 1 in the present embodiment can provide improved operability. In particular, since the biometric information sensor device 1 issues a notification for failure to read the biometric information 26 after detection of the contact, users are less likely to repeat attempt of reading without recognizing the read failure and operability is thereby improved, as compare to when such a configuration is not adopted.

When a conductive foreign matter is sticking to the reading surface 20, the biometric information sensor device 1 can notify the user of it. In addition, by issuing the notification, the biometric information sensor device 1 can encourage the user to remove the conductive foreign matter sticking to the reading surface 20 so as to allow the biometric information sensor 2 to read normally.

The biometric information sensor device 1 can make a determination whether to issue the notification about the user's operation as well as a determination whether to issue the notification about the conductive foreign matter. In addition, when the biometric information sensor device 1 periodically switches between a determination whether to issue the notification about the user's operation and a determination whether to issue the notification about the conductive foreign matter, the number of notifications is reduced as compared when such a configuration is not adopted.

The biometric information sensor device 1 is configured to issue a notification when the reading fails after the contact is detected. Therefore, even when capacitance is generated in the detection electrodes 21 due to exogenous noise, etc., the biometric information sensor device 1 is prevented from erroneously determining the read failure even though the reading is not performed, unlike when successful or unsuccessful reading is determined without performing detection of the contact.

Although some embodiment and modifications of the invention have been described, the embodiment and modifications are merely examples and the invention according to claims is not to be limited thereto. These new embodiment and modifications may be implemented in various other forms, and various omissions, substitutions and changes, etc., can be made without departing from the gist of the invention. In addition, all combinations of the features described in the embodiment and modifications are not necessary to solve the problem of the invention. Further, these embodiment and modifications are included within the scope and gist of the invention and also within the invention described in the claims and the range of equivalency.

REFERENCE SIGNS LIST

1 BIOMETRIC INFORMATION SENSOR DEVICE
2 BIOMETRIC INFORMATION SENSOR
3 CONTROL UNIT
9 OPERATION FINGER
20 READING SURFACE
21 DETECTION ELECTRODE
25 CAPTURED IMAGE
26 BIOMETRIC INFORMATION
27 CHARACTERISTIC FEATURE
30 CONTACT THRESHOLD VALUE
32 READING THRESHOLD VALUE

The invention claimed is:

1. A biometric information sensor device, comprising:
a controller that issues a first notification for failure to read biometric information of a detection target when reading of the biometric information fails after a contact of the detection target with a reading surface is detected,
wherein, when a number of failures to read biometric information is not less than a predetermined number after the contact with the reading surface is detected, the controller determines that a conductive foreign matter is sticking to the reading surface, and issues a second notification about the conductive foreign matter,
wherein the controller issues the first notification when the number of failures to read biometric information is less than the predetermined number, and issues the second notification instead of the first notification when the number of failures to read biometric information becomes not less than the predetermined number, and
wherein the predetermined number is equal to or greater than two.

2. The biometric information sensor device according to claim 1,
wherein, when the number of failures to read biometric information exceeds the predetermined number after the contact with the reading surface is detected, the controller determines that a conductive foreign matter is sticking to the reading surface, and issues a notification about the conductive foreign matter.

3. The biometric information sensor device according to claim 1,
wherein, after detecting the contact with the reading surface, the controller issues notifications while periodically switching between the first notification for failure to read the biometric information and the second notification about the conductive foreign matter.

4. The biometric information sensor device according to claim 1, comprising:
a biometric information sensor that includes a plurality of detection electrodes under the reading surface and reads the biometric information by means of capacitance generated between the detection target contacting the reading surface and the plurality of detection electrodes,
wherein the controller determines the contact of the detection target based on a plurality of capacitances obtained as a result of scanning the reading surface by the biometric information sensor, and then determines whether the biometric information is read based on a plurality of capacitances acquired after the contact of the detection target is determined.

5. The biometric information sensor device according to claim 4,
wherein the biometric information sensor generates capacitance information by binarizing the plurality of capacitances into capacitances of not less than a predetermined threshold value and capacitances of less than the threshold value and associating the capacitances with the positions of the detection electrodes, and thereby reads the biometric information.

6. The biometric information sensor device according to claim 5,
wherein the controller stores a contact threshold value defined as the number of detection electrodes having a capacitance of not less than the threshold value in the capacitance information, and determines that the detection target contacted the reading surface when the number of the detection electrodes having a capacitance of not less than the threshold value in the capacitance information is not less than the contact threshold value.

7. The biometric information sensor device according to claim 1, comprising:
a biometric information sensor that includes a plurality of detection electrodes under the reading surface and reads the biometric information by means of capacitance generated between the detection target contacting the reading surface and the plurality of detection electrodes; and a contact detection sensor that detects a contact of the detection target with the reading surface, wherein the controller determines the contact of the detection target using the contact detection sensor, and then determines whether the biometric information is read based on a plurality of capacitances acquired from the biometric information sensor after the contact of the detection target is detected.

8. The biometric information sensor device according to claim 3, wherein the controller stores a reading threshold value defined as a number of the detection electrodes having a capacitance of not less than the threshold value in the capacitance information, and determines that reading of the biometric information failed when the number of the detection electrodes having a capacitance of not less than the threshold value in the capacitance information is not more than the reading threshold value.

9. The biometric information sensor device according to claim 3, wherein the controller stores a reading threshold value defined as a number of characteristic features obtained by performing an extraction process on the capacitance information, and determines that reading of the biometric information failed when the number of the characteristic features obtained by performing the extraction process on the capacitance information is not more than the reading threshold value.

10. The biometric information sensor device according to claim 1, wherein a biometric information sensor reads a fingerprint as the biometric information.

* * * * *